Feb. 4, 1964   O. F. GERRY   3,120,056
POWER-OPERATED KNIFE
Filed July 31, 1963
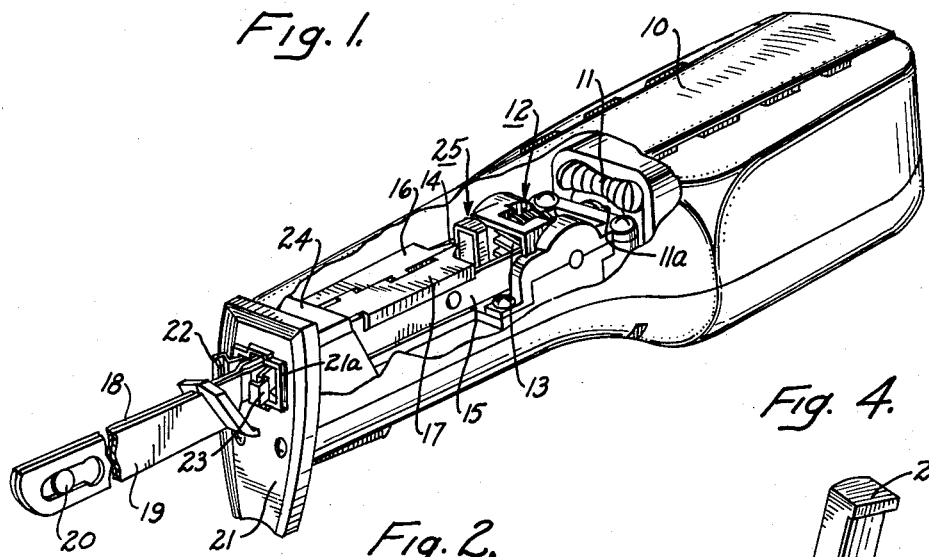
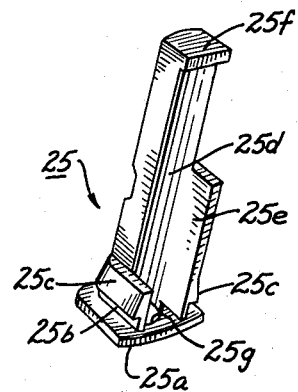
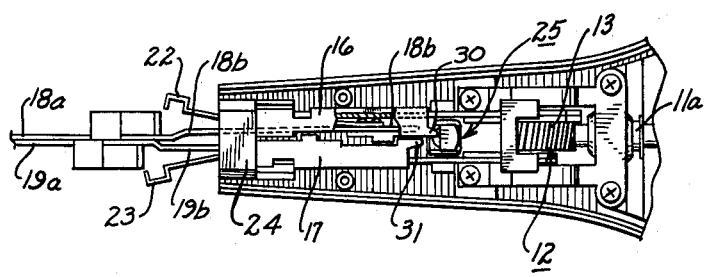
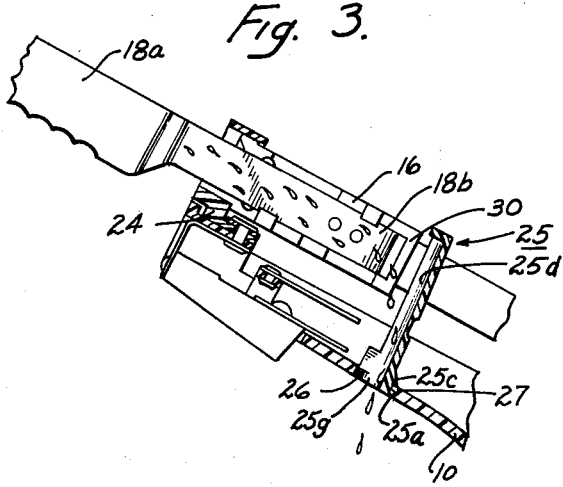
Inventor:
Otto F. Gerry
by [signature]
His Attorney

United States Patent Office 3,120,056
Patented Feb. 4, 1964

3,120,056
POWER-OPERATED KNIFE
Otto F. Gerry, Brockport, N.Y., assignor to General
Electric Company, a corporation of New York
Filed July 31, 1963, Ser. No. 298,971
10 Claims. (Cl. 30—272)

This invention relates to power-operated knives, and in particular to means adapted to prevent the flow of foreign matter from the cutting means of the knife to the drive mechanism.

One of the leading problems encountered in the design of power-operated slicing knives for home use is the need for means to prevent the entrance of foreign matter into the drive mechanism of the knife. Where the knife is of the hand-held variety, this problem becomes particularly acute in that the user may orient the knife into every possible position during the period of use or after use while the knife blades still have a film of liquid or fine food particles adhering to them. Liquids and food particles traveling along the knife blades which reach the drive mechanism may not only prevent reliable operation of the knife by clogging close-toleranced bearing elements but where electrical drive means are used, a potential safety hazard may be created.

When a knife having a pair of relatively reciprocating knife blades held in sliding contact with one another is used, such blades increase the flow of liquids and food particles along the blades toward the drive mechanism. This is due to the fact that such foreign matter is thrown forward and backward by the rapid relative reciprocation of the blades. Thus, it has been found desirable to prevent the flow of liquid from between the knife blades toward the drive mechanism when the knife is held in all positions, as for example, an inclined position with the knife blades pointing upwardly. Furthermore, it has been found that the contacting relation of the knife blades tends to retain small amounts of moisture along the interface of the blades. The user may not be aware of such moisture collection and upon inadvertently turning the knife to the point-up position liquid will migrate toward the drive mechanism.

Accordingly, it is one object of this invention to provide an improved power-operated slicing knife having means to prevent foreign matter moving rearwardly along the knife blade from reaching the drive mechanism.

It is a further object of this invention to provide a power-operated slicing knife having a drive unit which is particularly designed to control the flow of foreign matter moving from the knife blades toward the drive mechanism.

In carrying out the objects of my invention in one form thereof, a power-operated knife is provided having an elongated cutting means and a drive mechanism connected thereto to drive the cutting means with a reciprocating motion. A unique receiving means is positioned between the rearward portion of the knife blade and the drive mechanism to receive any foreign matter moving rearwardly from the cutting means and to conduct such matter away from the drive mechanism.

As another feature of my invention, means connecting the drive mechanism to the cutting means are provided with rearwardly extending projections to insure the flow of foreign matter leaving the knife blades to the receiving means.

In accordance with yet another aspect of my invention the receiving means is mounted with the drive mechanism in a housing. The housing is provided with an aperture beneath the foreign matter-receiving means to permit the flow of such matter from the receiving means to the outside of the housing.

Other objects and advantages of my invention may best be understood by reference to the following description taken in connection with the accompanying drawings in which:

FIG. 1 is a perspective view of a power-operated slicing knife incorporating my invention, having a portion of the knife blades removed for clarity and a portion of the drive housing cut away to reveal the drive elements;

FIG. 2 is a plan view of the forward portion of the knife with the upper portion of the drive housing removed to show the drive mechanism;

FIG. 3 is a side view, in partial section, showing the flow of liquid along a knife blade toward the drive mechanism and the function of the flow diverter means; and FIG. 4 is an enlarged perspective view of the flow diverter means of FIG. 3.

The power-operated slicing knife shown in FIG. 1 includes a handle or housing 10 which encloses a motor 11, a drive mechanism or transmission 12 having a gear 13, a pair of connecting rods 14 and 15, a pair of blade receiving channel members 16 and 17, and a pair of knife blades 18 and 19. Gear 13 meshes with a worm formed on the forward end of the motor shaft 11a and drives a double eccentric unit (not shown) which is connected to the rearward portions of the connecting rods. Through this arrangement, the rotation of motor shaft 11a drives connecting rods 14 and 15 with short counter-reciprocating strokes.

Any conventional connecting means, such as keyhole slot and rivet arrangement 20, may be used to hold the forward portions of blades 18 and 19 in intimate sliding contact. The forward end of housing 10 includes a transversely extending flange or hilt 21 which is apertured at 21a to permit the entrance of the knife blades into housing 10 for connection to the drive mechanism. A pair of resilient latches having forward gripping portions 22 and 23 may be secured to the knife blades to permit engagement and disengagement of the knife blades and connecting rods 14 and 15.

The relationship of the knife blades to the channel members may best be seen in FIGS. 2 and 3. Blades 18 and 19 include forward cutting portions 18a and 19a and rearward tang portion 18b and 19b, respectively. The tang portions of the knife blades are adapted to be received in the channel members as shown for blade 18 and channel 16 in FIG. 3.

While the blade cutting portions are held in sliding contact by slot and rivet arrangement 20, the rearward tang portions are slightly spaced. Thus, when the knife is oriented vertically with the blades pointed upwardly, foreign matter may drop from between the blades towards the drive mechanism.

Connecting rods 14 and 15 extend forwardly to a point adjacent aperture 21a, being secured by any suitable means to channel members 16 and 17. The forward portions of the channel members are slidingly supported in a guide 24. It should be noted that the knife tang portions such as 18b extend a substantial distance into the interior of housing 10 and almost to the end of their respective channel member. As the connecting rods are driven with a reciprocating motion from the drive mechanism 12 when motor 11 is operated, the knife blades are reciprocated by the connecting rods with the channel members. The blades are substantially free of relative movement with respect to the channel members.

In accordance with one aspect of my invention, a unique flow diverter or drain tube 25 is positioned immediately to the rear of channel members 16 and 17 and centrally located across the width of housing 10 between connecting rods 14 and 15. Tube 25 is preferably an integral molded unit of polyethylene and is positioned directly above a rectangular aperture 26 which is formed in the bottom wall of housing 10.

As shown in FIG. 4, the bottom of tube 25 includes an arcuate surface 25a which conforms to the lower surface of housing 10 and a recess 25b which extends around three sides of the tube for mating engagement with an integral projection 27 of the knife housing. Tube 25 is secured to housing 10 by being pushed upwardly through aperture 26 until angled surfaces 25c are forced past projection 27, with projection 27 then locking into recess 25b. Tube 25 generally takes the form of a vertical trough having a parti-cylindrical receiving surface or portion 25d which extends from the bottom of the housing to a point above the top of the channel members 16 and 17. The side walls of receiver portion 25d extend forwardly in places as at 25e to improve the receiving characteristics of the tube. The left side wall, as viewed in FIG. 4, has not been extended as at 25e to permit adequate passage for electrical wiring within the knife housing. A forwardly extending top surface 25f prevents the splashing of liquid over the top of the receiving portion 25d. To further insure the downward flow of liquids and fine food particles along surface 25d, tube 25 is slanted forwardly from bottom to top as may be seen in FIG. 3. A circular aperture 25g is formed in the bottom surface 25a of the drain tube to permit the flow of fluid material to the exterior of housing 10 from surface 25d through housing aperture 26.

In order to insure that fluid materials passing rearwardly along blade tangs 18b and 19b do not by-pass drain tube 25, integral vertical lips or projections 30 and 31 are respectively formed on the rearward end of channel members 16 and 17. Drain tube 25 is positioned so that when channel members 16 and 17 are at their rearmost position, projections 30 and 31 extend to a point immediately in front of wall 25d. Thus, when liquid materials are being thrown rearwardly with the rearward motion of the blade and channel members, the liquid leaves the rear projections 30 and 31 when almost in contact with surface 25d.

As shown in FIG. 3, the flow of liquid along the blade takes place rearwardly along tang portion 18b onto channel 16, to projection 30, and then into drain tube 25 when the blade reaches its rearmost stroke position. Liquid materials striking drain tube 25 along surface 25d then descend downwardly out of housing 10 through aperture 26. The cooperation of tang portion 19b, channel 17 and projection 31 is identical to that related above.

It can be seen, therefore, that I have provided a simple, low cost means for preventing the flow of liquid materials from a reciprocating cutting means to the drive mechanism of a power-operated knife, regardless of the position in which the knife is held. Even though the knife may be pointed directly upwardly with a relatively large amount of fluid on the cutting means, my invention has proven capable of diverting the flow of such liquids out of housing 10 prior to reaching the drive mechanism. By preventing the flow of foreign matter into the rotating portions of the drive mechanism, the high tolerance mechanical elements, such as the bearings, are not clogged or otherwise damaged and the electric motor elements are not vulnerable to short circuiting.

While I have shown and described a specific embodiment of my invention, I do not desire my invention to be limited to the particular construction shown and described. Instead, I intend, by the appended claims to cover all modifications within the spirit and scope of my invention.

What I claim is:

1. A power-operated slicing knife comprising:
   (a) a support having a bottom wall;
   (b) means defining an aperture in said wall;
   (c) a drive mechanism mounted on said support adapted to be connected to a power source;
   (d) elongated cutting means extending forwardly from said support having a forward cutting portion and a rearward tang portion;
   (e) means connecting said cutting means to said drive mechanism for reciprocating said cutting means in a direction along the length of said cutting means when said drive mechanism is operated; and
   (f) a draining element positioned in longitudinal alignment with said rearward tang portion between said cutting means and said drive mechanism and extending upwardly from said bottom wall for receiving any foreign matter moving rearwardly from the rearward portion of said cutting means and for directing the flow of such matter away from said drive mechanism and through said aperture.

2. A power-operated knife comprising:
   (a) a hollow handle having a bottom wall;
   (b) means defining an aperture in said bottom wall;
   (c) a drive mechanism within said handle adapted to be connected to a power source;
   (d) cutting means extending into said handle and having a forward cutting portion and a rearward tang portion;
   (e) means connecting said tang portion of said cutting means with said drive mechanism for driving said cutting means with a slicing motion when said drive mechanism is operated; and
   (f) a draining element within said handle, having a receiving surface extending upwardly from said bottom wall in longitudinal alignment with said rearward tang portion between said cutting means and said drive mechanism, and communicating with said aperture for conducting any foreign matter entering said housing from said cutting means to the exterior of said housing.

3. An electric slicing knife comprising:
   (a) an elongated hollow handle having a bottom wall;
   (b) drive means including an electric motor and a drive mechanism supported within said handle and adapted to be connected to a source of power;
   (c) a pair of knife blades in sliding contact with one another, extending into said handle for connection to said drive mechanism;
   (d) means connecting said knife blades to said drive mechanism for imparting a counter-reciprocating motion to said blades; and
   (e) a drain tube, positioned rearwardly of said knife blades and forwardly of said drive mechanism and said motor, having a transverse surface extending upwardly from said bottom wall in said handle in longitudinal alignment with said knife blades for receiving any foreign matter entering said handle from said blades to conduct said foreign matter away from said drive mechanism and said motor.

4. A power-operated slicing knife comprising:
   (a) a support having a bottom wall;
   (b) a drive mechanism mounted on said support and adapted to be connected to a power source;
   (c) cutting means having a forward cutting portion and a rearward tang portion;
   (d) means connecting said rearward tang portion of said cutting means to said drive mechanism;
   (e) a rearwardly extending projection on said connecting means positioned immediately rearwardly of said tang portion; and
   (f) means having a transverse surface extending upwardly from said bottom wall between said drive mechanism and said cutting means and positioned adjacent said projection for receiving any foreign matter flowing rearwardly from said cutting means to said projection and for conducting said matter away from said drive mechanism.

5. An electrically operated slicing knife comprising:
   (a) a housing having a bottom wall;
   (b) an electrical motor secured within said housing;
   (c) a transmission mounted within said housing and connected to said motor;
   (d) a knife blade having a forward cutting portion and a rearward tang portion extending into said housing;
(e) means for driving said blade from said transmission with a reciprocating motion including:
(aa) a connecting rod connected to said transmission and to said blade, and
(bb) a channel member connected to said connecting rod and adapted to receive said tang portion;
(f) a rearwardly extending projection on said channel member adjacent the rearward end of said tang portion; and
(g) means having a transverse surface extending upwardly from said bottom wall between said transmission and said channel projection, immediately rearwardly of said projection, for receiving any foreign matter flowing rearwardly from said blade to said projection and for conducting said matter away from said transmission.

6. The slicing knife recited in claim 5 wherein said last-named means includes spaced forwardly extending surfaces adapted to receive said channel projection therebetween when said projection is in its rearmost position.

7. A power-operated slicing knife comprising:
(a) an elongated housing having a bottom wall;
(b) drive means within said housing;
(c) a pair of connecting rods within said housing spaced from one another and parallel to the longitudinal axis of said housing;
(d) a transmission secured in said housing rearwardly of said connecting rods for connecting said drive means to said connecting rods to drive said connecting rods with counter-reciprocating motions;
(e) a pair of knife blades each connected to one of said connecting rods;
(f) said blades each having a forward cutting portion and a rearward tang portion;
(g) means holding said forward cutting portions in sliding relation to one another; and
(h) a drain tube secured to said housing extending upwardly from said bottom wall between said connecting rods and between said blades and said transmission to receive any foreign matter flowing rearwardly from said knife blades.

8. The slicing knife recited in claim 7 wherein said bottom wall of said housing has an aperture formed therein and said drain tube includes a bottom wall having an aperture formed therein for communication with said aperture of said housing wall to conduct foreign matter received by said drain tube to the exterior of said housing.

9. A power-operated slicing knife comprising:
(a) support means having a bottom wall;
(b) a drive mechanism secured to said support means and adapted to be connected to a power source;
(c) cutting means slidable on said support means and connected to said drive mechanism for slicing motion therewith when said drive mechanism is operated; and
(d) drain tube secured to said support means having:
(aa) a flange adapted for engagement with said support means,
(bb) means defining an aperture on said flange, and
(cc) an elongated arcuate surface extending upwardly from said bottom wall between said cutting means and said drive mechanism.

10. An electrically operated slicing knife comprising:
(a) a hollow handle having a bottom wall;
(b) an electric motor mounted in said handle and adapted to be connected to a source of power;
(c) a drive mechanism supported within said handle and connected to said motor;
(d) a knife blade having a forward cutting portion and a rearward connecting portion extending into said handle;
(e) means for connecting said rearward connecting portion of said blade to said drive mechanism; and
(f) draining means, positioned rearwardly of said knife blade and forwardly of said drive mechanism and said motor, having a receiving surface in longitudinal alignment with said rearward connecting portion and extending upwardly from said bottom wall to at least as far as the uppermost portion of said blade for receiving any foreign matter entering said handle from said blades and conducting said matter away from said drive mechanism and said motor.

References Cited in the file of this patent
UNITED STATES PATENTS

| | | |
|---|---|---|
| 2,168,703 | Dziedzic et al. | Aug. 8, 1939 |
| 2,990,614 | Taggart | July 4, 1961 |

FOREIGN PATENTS

| | | |
|---|---|---|
| 1,168,877 | France | Sept. 1, 1958 |